(12) United States Patent
Biver et al.

(10) Patent No.: US 8,630,832 B2
(45) Date of Patent: Jan. 14, 2014

(54) ESTIMATION OF LITHOLOGICAL PROPERTIES OF A GEOLOGICAL ZONE

(76) Inventors: Pierre Biver, Pau (FR); Denis Allard, Avignon (FR); Dimitri D'Or, Sombreffe (BE)

( * ) Notice: Subject to any disclaimer, the term of this patent is extended or adjusted under 35 U.S.C. 154(b) by 250 days.

(21) Appl. No.: 13/131,312

(22) PCT Filed: Nov. 25, 2009

(86) PCT No.: PCT/FR2009/052301
§ 371 (c)(1),
(2), (4) Date: May 26, 2011

(87) PCT Pub. No.: WO2010/061135
PCT Pub. Date: Jun. 3, 2010

(65) Prior Publication Data
US 2011/0231170 A1      Sep. 22, 2011

(30) Foreign Application Priority Data
Nov. 26, 2008 (FR) ...................................... 08 58021

(51) Int. Cl.
| | | |
|---|---|---|
| G06F 17/00 | (2006.01) |
| G06F 17/18 | (2006.01) |
| G06N 5/00 | (2006.01) |
| G06N 7/00 | (2006.01) |
| G06N 7/06 | (2006.01) |

(52) U.S. Cl.
USPC ...................................... 703/10; 703/2; 703/6

(58) Field of Classification Search
None
See application file for complete search history.

(56) References Cited

U.S. PATENT DOCUMENTS 5,416,750 A * 5/1995 Doyen et al. .................... 367/73
2006/0041410 A1 * 2/2006 Strebelle ......................... 703/10

FOREIGN PATENT DOCUMENTS

| EP | 1930744 A1 | 6/2008 |
|---|---|---|
| WO | WO 2006023597 A2 | 3/2006 |
| WO | WO 2006023597 A3 | 3/2006 |

OTHER PUBLICATIONS

Strebelle et al., Reservoir Modeling Using Multiple-Point Statistics, SPE Annual Technical conference and Exhibition, New Orleans, Sep. 30-Oct. 3, 2001, SPE # 71324.*
Bogaert, "Spatial Prediction of Categorical Variables: The Bayesian Maximum Entropy Approach," *Stochastic Environmental Research and Risk Assessment*, vol. 16 (2002), Title page, Publication page, and pp. 425-448.
Deming et al., "On a Least Squares Adjustment of a Sampled Frequency Table When the Expected Marginal Totals are Known," *The Annals of Mathematical Statistics*, vol. 11 (1940), Title page, Publication page, and pp. 427-444.

(Continued)

*Primary Examiner* — Kamini S Shah
*Assistant Examiner* — Michael P Healey
(74) *Attorney, Agent, or Firm* — Patterson Thuente Pedersen, P.A.

(57) ABSTRACT

A method of estimating lithologic properties of a geological zone represented by a grid, in which method facies are allocated to the nodes of the grid by sequential stochastic simulation. For a target node ($x_0$) from a set of target nodes for scanning iteratively, and for each possible facies ($c_{k0}$), a conditional probability ($p_{k_0/k_1, \ldots, k_n}$) of observing said facies is estimated knowing that respective facies have already been allocated to other nodes in the neighborhood. A random draw weighted by these conditional probabilities is then performed. The estimation of the conditional probabilities makes use of univariate probabilities ($p_{k0}$) and of bivariate probabilities ($p_{k_0,k_i}$) of observing two facies at two respective nodes of the grid. Each bivariate probability used in estimating the conditional probability relates to the target node ($x_0$) and to a node ($x_i$) neighboring the target node.

11 Claims, 7 Drawing Sheets

(56) References Cited

OTHER PUBLICATIONS

Vargas-Guzman et al., "Spatial Conditional Simulation of Facies Objects for Modeling Complex Clastic Reservoirs," *Journal of Petroleum Science and Engineering*, vol. 54 (2006), Title page and pp. 1-9.

Wibrin et al., "Combining Categorical and Continuous Spatial Information with the Bayesian Maximum Entropy Paradigm," *Stochastic Environmental Research and Risk Assessment*, vol. 20 (2006), pp. 423-433.

* cited by examiner

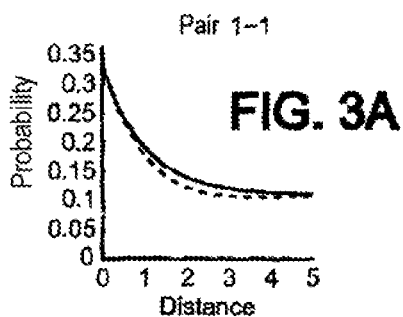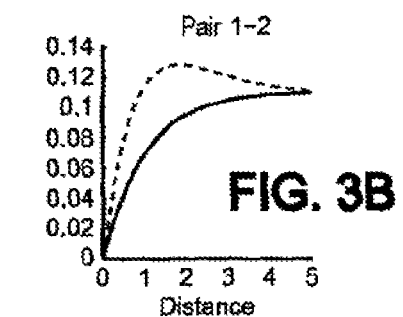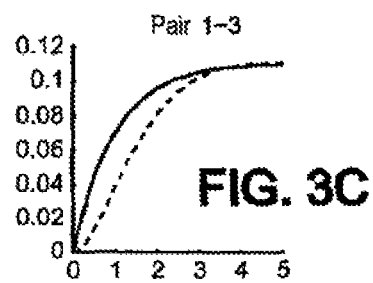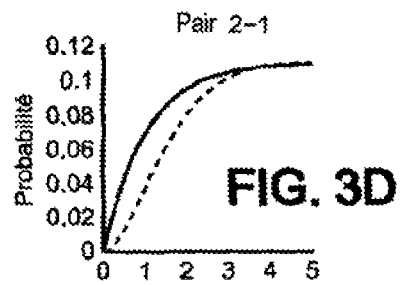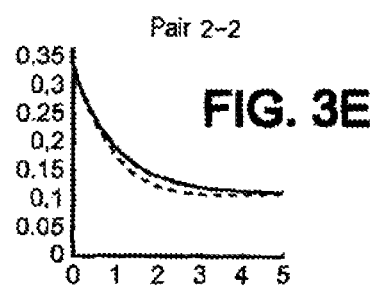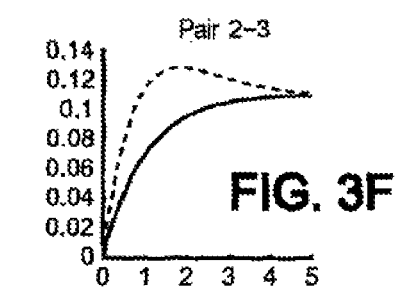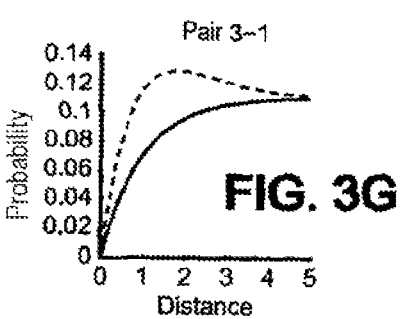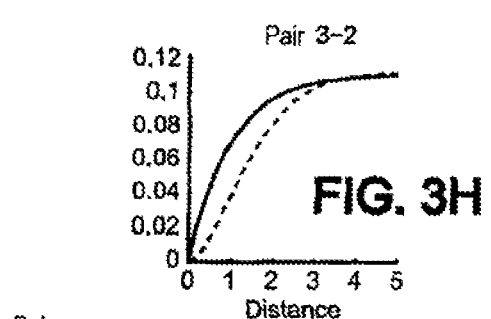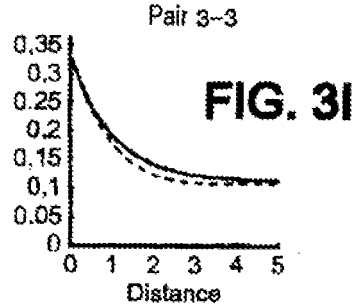

ESTIMATION OF LITHOLOGICAL PROPERTIES OF A GEOLOGICAL ZONE

PRIORITY CLAIM

The present application is a National Phase entry of PCT Application No. PCT/FR2009/052301, filed Nov. 25, 2009, which claims priority from French Application Number 08 58021, filed Nov. 26, 2008, the disclosures of which are hereby incorporated by reference herein in their entirety.

FIELD OF THE INVENTION

The invention relates to the field of estimating lithologic properties of a geological zone for studying the subsoil.

It is known to simulate a geological zone in order to estimate the geometrical structure of a reservoir and the nature of the rocks making up the reservoir (sandstones, carbonatious rocks, shales, . . . ), i.e. the lithology of the reservoir. It is thus possible to determine which regions of the geological zone have the greatest likelihood of containing hydrocarbons, or regions in which it may be advantageous to drill an injection borehole for improving hydrocarbon recovery, or the types of fluids recovered, etc. The ultimate purpose is to obtain a representation of the reservoir that is as accurate as possible in order to determine as well as possible technical parameters relating to prospecting, studying, or working the zone. In the oil industry, it is crucial for the simulation to be as accurate as possible.

In general, a geologist has only a small amount of experimental data (e.g. obtained by core drilling the reservoir at certain points). The simulation consists in constructing an image of the reservoir by interpolating from the known experimental data.

Nevertheless, because of the small amount of information available, it is necessary to have recourse to probabilistic construction methods.

Generally, the simulation is performed by computer, and the geometrical structure of the reservoir is represented in the form of a grid.

In conventional manner, each of the nodes of the grid is identified by its coordinates in space along three axes. For example, the coordinates $(x_0, y_0, z_0)$ define one node, which node is written $x_0$ in the present description for reasons of clarity.

A categorical variable is a function that is capable of taking a finite number of states. For example, in a reservoir, if the categorical variable is lithology, then the various states are the types of facies that might be observed in the reservoir, for example shales, clays, sandstones, . . . .

In order to simulate the lithology of the reservoir, each node of the grid has a state allocated thereto selected from a set of states that can be taken by the categorical variable. For example if three possible different facies (shales, clays, sandstones) are observable in the reservoir, then there are three states that the categorical variable can take, namely a state $c_1$ that corresponds to shales, a state $c_2$ that corresponds to clays, and a state $c_3$ that corresponds to sandstones. Consequently, there are three possible allocations ($c_1$, $c_2$, and $c_3$) for each node of the grid.

In stochastic simulation methods, a state $c_k$ is allocated to a node $x_i$ of the grid by means of a random draw weighted by the probabilities of the states $c_k$ occurring. When the states are facies, this is conventionally referred to as facies simulation.

In sequential stochastic simulation methods, the facies are simulated at a given node of the grid as a function of the facies that have already been allocated to other nodes of the grid. In the end, the entire grid is scanned sequentially. This is referred to as sequential simulation since previously-simulated nodes are used for simulating new nodes of the grid.

The conditional probability at node $x_0$ is the probability of observing some particular state of a categorical variable, e.g. a facies, at a node $x_0$ of the grid, knowing the state of said categorical variable at other nodes of the grid, typically nodes neighboring the node $x_0$. Sequential stochastic simulation methods consist in determining such conditional probabilities and then in simulating the state of a categorical variable, and doing this sequentially for each of the nodes of the grid. Establishing conditional probabilities is thus an essential step in the simulation method.

BACKGROUND OF THE INVENTION

Several methods are known for determining conditional probabilities. For example, in the multipoint statistical method, conditional probabilities are evaluated by enumerating events for given configurations of points in a training image. That method is described in particular in application WO 2006/023597.

The method of simulation by multinominal random fields as developed by P. Bogaert (see for example "Spatial prediction of categorical variables, the Bayesian maximum entropy approach", published in the journal: Stochastic environmental research and risk assessment, Vol. 16, No. 6, December 2002, pp. 425-448, Springer Berlin/Heidelberg, DOI: 10.1007/s00477-002-0114-4), makes use of a step of calculating joint probabilities. A joint probability is a probability of obtaining a given event, the event consisting in a configuration state, i.e. an arrangement of states for a categorical variable located in space.

Thus, in the context of simulating a geological zone, a joint probability is the probability of simultaneously observing N states of a categorical variable $c_{k0}, c_{ki}, \ldots, c_{k(N-1)}$ at N respective nodes $x_0, x_1, \ldots, x_{N-1}$ of the grid. If consideration is given to a pair of nodes, then this is referred to as bivariate probability rather than joint probability.

On the basis of such joint probabilities, it is possible to determine conditional probabilities by using Bayes' theorem.

In order to establish joint probability tables, use is conventionally made of the method of maximizing likelihood. In the algorithm proposed by Bogaert, likelihood is maximized by using the iterative proportional fitting (IPF) algorithm as described for example by W. E. Deming and F. F. Stephan in "On a least square adjustment of a sample frequency table when the expected marginal totals are known", Annals of Mathematical Statistics, Vol. 11, p. 427, 1940, but by applying it to the geostatistical context. That method makes use of bivariate probabilities for simultaneously observing two states of a categorical variable $c_k$, $c_{k'}$ at two respective nodes $x_i$, $x_{i'}$ of the grid.

It is thus necessary to calculate bivariate probabilities for each pair $c_k$, $c_{k'}$ of states of the categorical variable and for each pair of nodes $x_i$, $x_{i'}$ of the nodes in the neighborhood under consideration. This step is relatively expensive in calculation time and in memory, and in practice it becomes very difficult to implement, in particular when using more than twenty neighboring nodes and more than three categorical variable states.

OBJECT AND SUMMARY OF THE INVENTION

The invention seeks to solve this problem by proposing to estimate the conditional probabilities from a reduced number of bivariate probabilities. More precisely, while estimating a conditional probability at node $x_0$, each bivariate probability involved in the estimation refers to the node $x_0$ and to a node $x_i$ neighboring the node $x_0$, which node already has a categorical variable state allocated thereto. This eliminates crossed terms corresponding to bivariate probabilities between two nodes in the vicinity of the node $x_0$.

In a first aspect, the invention provides a method of estimating lithologic properties of a geological zone simulated by a computer or other computing means, the method comprising:

a) representing the geological zone using a grid having nodes;

b) representing a lithologic property with the help of a categorical variable; and for each node in a set of target nodes of the grid to be scanned iteratively:

c) for each possible state of the categorical variable estimating the value of a conditional probability of observing said state of the categorical variable at the target node, knowing that a respective state has been allocated to at least one node neighboring the target node, on the basis of:

values of univariate probabilities of observing a state of the categorical variable for the target node; and bivariate probabilities of observing two states of the categorical variable for two respective nodes of the grid;

wherein the bivariate probability values that are used in estimating the value of the conditional probability relate to the target node and to a node neighboring the target node;

d) making a random draw from among possible states for the categorical variable, the draw being weighted by the conditional probability values estimated in step c); and e) allocating the state drawn randomly in step d) to the target node.

The steps c), d), and e) are repeated iteratively so as to scan through all of the nodes that are to be simulated, typically all of the nodes of the grid that have not yet had a state allocated thereto.

Such a method requires smaller memory and/or calculation resources than the prior art simulation method because of the small number of bivariate probabilities and the lack of joint probabilities of order greater than 2.

This method, which is relatively simple to implement, makes it possible to obtain simulations that are relatively reliable.

In addition, the method can make it possible to calculate directly the values of the conditional probabilities without any prior calculation or storage of joint probability tables.

The lithologic property represented by the categorical variable may be a facies, a rock type, or a geological environment type.

The term "node neighboring the target node" is used to mean any node in the grid that is close enough to the target node for the states of the categorical variable that might already have been allocated to those nodes to have some non-negligible influence on the state of the categorical variable at the target node.

Provision may be made to select the nodes to be taken into consideration in step c) by defining a geometrical domain around the target node and by taking into consideration the nodes in that domain for which a state has already been allocated.

Advantageously, prior to the step of estimating the conditional probability, a bivariate probability model is provided that, for each pair of states of the categorical variable, gives the probability of observing two states of the categorical variable for two respective nodes of the grid, depending on the positions of said nodes relative to each other.

During step c) of estimating the conditional probability, for each possible categorical variable state, and for each pair of nodes comprising a target node and a neighboring node that already has a categorical variable state allocated thereto, it is possible to extract from the model the value of the bivariate probability of observing two states of the categorical variable for a pair of nodes having the same positions relative to each other as the target node and the neighboring node.

This use of a model is based on the assumption that bivariate probabilities do not vary depending on the position of target and neighboring nodes in the grid, the model being a function of the positions of said nodes relative to each other. Having recourse to this assumption of second-order stationarity makes it possible to obtain the bivariate probabilities relatively easily.

The bivariate probability model is a set of functions giving the probability of simultaneously observing one state of a categorical variable, e.g. a facies written $c_k$ at a node $x_i$ of the grid, and another state of the categorical variable, e.g. a facies written $c_{k'}$ at another node $x_{i'}$ of the grid, as a function of the positions of the nodes $x_i$ and $x_{i'}$ relative to each other, e.g. as a function of the distance h between them, where $c_k$ and $c_{k'}$ may be identical or different.

These functions are provided for each pair $(c_k, c_{k'})$ of states of the categorical variable. Thus, if consideration is given to a reservoir having three possible facies written $c_1, c_2, c_3$, then a bivariate probability model is provided that has nine analytic functions corresponding to the following pairs $(c_1,c_1)$, $(c_1,c_2)$, $(c_1,c_3)$, $(c_2,c_1)$, $(c_2,c_2)$, $(c_2,c_3)$, $(c_3,c_1)$, $(c_3,c_2)$, and $(c_3,c_3)$.

In a first embodiment, the bivariate probability model is stationary and isotropic, i.e. the probability of observing two given states $c_k$ and $c_{k'}$ at two respective nodes $x_i$ and $x_{i'}$ depends only on the distance h between the nodes $x_i$ and $x_{i'}$. The function corresponding to a pair $(c_k, c_{k'})$ is identical to the function corresponding to the pair $(c_{k'}, c_k)$, such that the model is relatively simple and occupies relatively little memory, which can be advantageous when the number of possible states is high.

In a second implementation, the bivariate probability model is stationary and anisotropic, i.e. the probability of observing two given states $c_k$ and $c_{k'}$ at two respective nodes $x_i$ and $x_{i'}$ depends on the distance h between the nodes $x_i$ and $x_{i'}$, and also on the respective orientation of the nodes $x_i$ and $x_{i'}$. In such a model, a set of functions is provided for each pair $(c_k, c_{k'})$ of states of the categorical variable, with each function corresponding to a direction in space. Such a model makes it possible to represent the asymmetry of deposits.

The bivariate probability model may be obtained:

From borehole data: the set of states of the categorical variable, e.g. facies, as observed in different boreholes is taken into consideration. For a given pair of states, e.g. $(c_1,c_2)$ with $c_1$ corresponding to clays and $c_2$ to sandstones, as observed at two points $x_i$, $x_{i'}$ that are spaced apart by a distance h, the number of occurrences of said pair of states for the selected distance h is determined. Knowing the total number of pairs spaced apart by h in the data set, it is possible to calculate the probabilities of any particular pair of observed facies $(c_1,c_2)$ occurring at two points $x_i$, $x_{i'}$ that are spaced apart by h. By repeating this operation for increasing distances h, some number of experimental events is obtained. A function is fitted to these numbers. The bivariate probability model is thus constructed in this way for each pair of states. In the implementation in which the bivariate probability model is anisotropic, these numbers are determined for a plurality of directions. A function is finally obtained for each pair of states and for each direction taken into consideration.

From a reference image: the reference image corresponds to a plausible representation of the reservoir as provided by the geologist. The method is the same, but the pair of facies ($c_1,c_2$) is no longer taken from the data observed in boreholes, but rather from the reference image. An example of a reference image (dunes) is given in FIG. 4.

It is possible to provide an initialization step during which a categorical variable state is allocated to at least one node of the grid. Thus, it is possible to use this knowledge of the states of one or more nodes when performing the stochastic simulation of a state for the first target node in the set of target nodes that are to be scanned iteratively.

During this initialization step, one or more nodes have respective states allocated thereto. By way of example, these states may be facies observed from the real geological zone, and/or states obtained by stochastic simulation from univariate probabilities extracted from the bivariate probability model.

For example, categorical variable states corresponding to facies may be obtained by direct observation, e.g. by core drilling, or as a result of interpreting seismic measurements. These states are allocated to the corresponding nodes of the grid during an initialization step.

In another example, if the geologist does not have any observed states, then a state is allocated to a node of the grid by stochastic simulation on the basis of univariate probabilities extracted from the bivariate probability model. The univariate probability values are easily extracted from the bivariate probability model by taking into consideration only pairs where both have the same state, e.g. ($c_1,c_1$), ($c_2,c_2$), ($c_3,c_3$) and by taking into consideration "pairs" of nodes of the grid that are spaced apart by a distance of zero.

The stochastic simulation steps c), d), and e) are repeated iteratively making it possible to allocate states to target nodes of the grid. The invention is not limited in any way by the order in which the zones of the grid are scanned.

For example, M sub-grids are extracted from the grid defined in step a), each sub-grid being made up of nodes that are spaced apart from one another by half as much as the nodes of the preceding sub-grid, the sub-grid of level M corresponding to maximum spacing, and the sub-grid of level 0 corresponding to the grid defined in step a). Steps c), d), and e) are initially applied to the nodes of the $M^{th}$ sub-grid, so as to allocate facies to each node in said $M^{th}$ sub-grid. Thereafter, for m ranging from M−1 to 0, the steps c), d), and e) are applied to the nodes of the $m^{th}$ sub-grid, using the states allocated to the nodes of the sub-grid of level m+1.

In another aspect, the invention provides a computer program product for storing in a memory of a central unit and/or for storing on a memory medium for co-operating with a reader of said central unit and/or for downloading via a telecommunications network, the product being characterized in that it includes instructions for executing the steps of the above-described method.

According to yet another aspect, the invention provides a device for estimating lithologic properties of a geological zone, the device comprising a memory unit for storing a grid comprising spatial coordinates of nodes, and for storing a finite number of values that correspond to states that might be taken by a categorical variable representing a lithologic property. The device also comprises processor means arranged to perform the following steps iteratively, each iteration corresponding to a target node of the grid:

for each possible state of the categorical variable, estimating a value for the conditional probability of observing said state for the target node knowing that a respective state of the categorical variable has been allocated to at least one node neighboring the target node, the estimation being made:

from univariate probabilities of observing a state of the categorical variable for the target node; and from bivariate probabilities of observing two states of the categorical variable for two respective nodes of the grid, in which the bivariate probabilities used in estimating the conditional probability relate to the target node and to a node neighboring the target node;

making a random draw from among the possible states, the draw being weighted by the conditional probability values as estimated in this way; and allocating to the target node the state as randomly drawn in this way.

By way of example, the device may comprise a computer, a calculator dedicated to stochastic simulation of geological zones, or some other device.

The memory unit may comprise one or more memories. By way of example, the processor means may comprise one or more processors.

BRIEF DESCRIPTION OF THE DRAWINGS

Other features and advantages of the present invention appear from the following detailed description made with reference to the accompanying drawings, in which:

FIGS. 3A to 3I show an example of a bivariate probability model;

MORE DETAILED DESCRIPTION

Unless specified otherwise, in the detailed description below, the grid is two-dimensional. It will readily be understood that the grid is advantageously three-dimensional, and that a two-dimensional grid has been selected for the description in order to make it easier to understand.

Figure 1A:
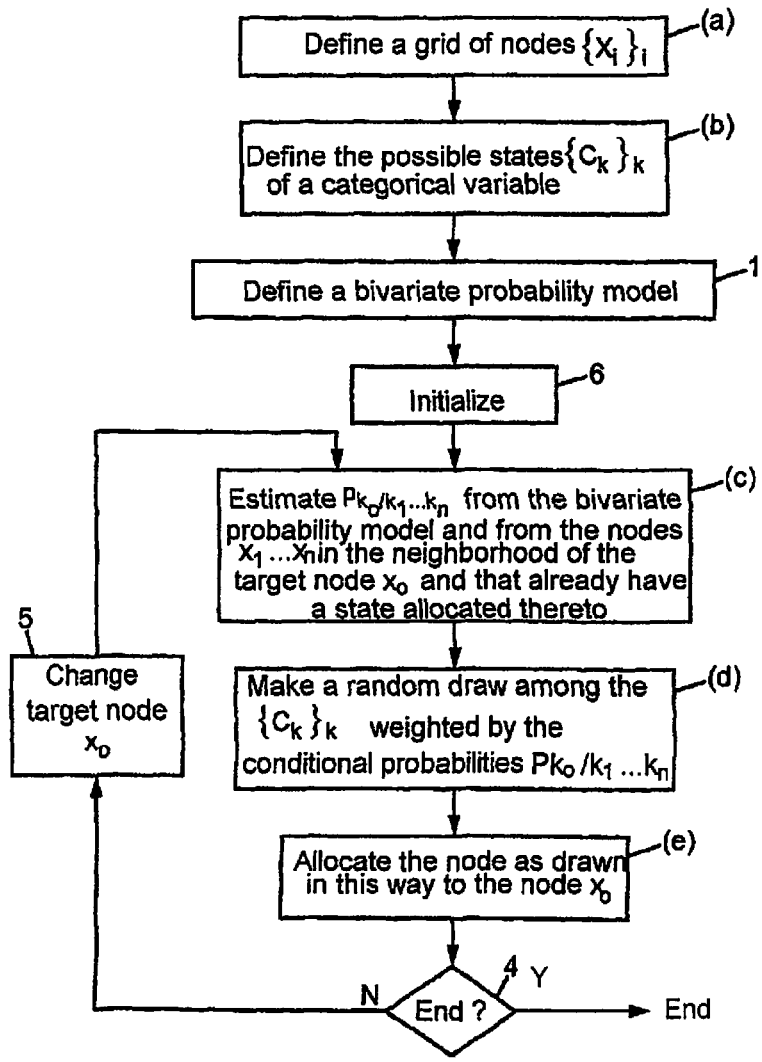
FIGS. 1A and 1B show an example algorithm for a method in an implementation of the invention.

With reference to FIG. 1A, there is shown an algorithm for a method of providing assistance in prospecting. The method serves to simulate a porous heterogeneous medium, e.g. a hydrocarbon reservoir.

A geometrical representation of the reservoir is provided in a step a), in the form of a grid. The spatial coordinates of nodes in the grid are stored in memory.

During a step b), a finite number of states of a variable representing a lithologic property are stored. In this example, each possible state of the categorical variable corresponds to a particular rock facies. For example, three states are stored: a state $c_1$ that corresponds to shales; a state $c_2$ to clays; and a state $c_3$ that corresponds to sandstones. For reasons of clarity, in the description below, the state $c_1$ is referred to as "facies $c_1$", the state $c_2$ as "facies $c_2$", and state $c_3$ as "facies $c_3$".

It is desired to allocate one facies to each node of the grid, which amounts to establishing the distribution of facies over the geometrical medium.

To do this, a bivariate probability model is defined during a step 1. By way of example, this model may be received from some other device, read from a memory, or indeed constructed from borehole data or from a reference image.

Figure 4:
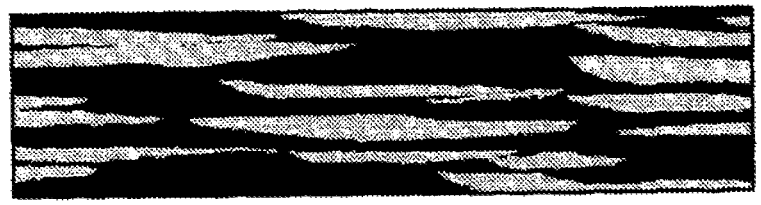
FIG. 4 shows an example of a reference image suitable for use in constructing a bivariate probability model.

An example of a reference image is shown in FIG. 4. It constitutes a plausible representation for the geological zone, as provided by a geologist. To construct the model, all of the facies identified in the reference image are taken into account. For a given pair of facies, e.g. ($c_1$,$c_2$), observed at two points spaced apart by a length h, account is taken of the number of occurrences of this pair of facies as a function of the distance h between the two points. Knowing the total number of given pairs of facies that are separated by a length h, it is possible to calculate the probability of an observed pair of facies ($c_1$,$c_2$) occurring at two points $x_1$, $x_2$ as a function of the distance between $x_1$ and $x_2$. A function is adjusted on the basis of this calculated data. The bivariate probability model is constructed in this way for each pair of facies.

FIG. 3 shows an example of a bivariate probability model for three possible facies $c_k$, giving nine pairs (k,k'). Each of the graphs shown represents one pair of facies. A distance between two nodes, normalized by the pitch of the grid, is plotted along the abscissa axis. The probability that two nodes will have the facies of the pair corresponding to the graph in question is plotted up the ordinate axis.

The model of FIG. 3 is stationary and anisotropic, i.e. the probability of observing two given states $c_k$, $c_{k'}$ at two respective nodes $x_i$, $x_{i'}$ depends on the distance h between the nodes $x_i$ and $x_{i'}$, and also on the respective orientation of the nodes $x_i$ and $x_{i'}$. Each graph also shows a plurality of curves, with each curve corresponding to a respective orientation. The continuous line curve gives the probability for a second node $x_{i'}$ on the same horizontal line of the grid and to the right of the first node $x_i$ (orientation at 0°), the dashed line curve gives the probability for a second node $x_{i'}$ on the same vertical line as the first node and higher up, i.e. closer to the surface of the ground, than the first node $x_i$ (orientation at 90°).

Univariate probabilities are easily extracted from this model: these are the probabilities for the pairs (1,1), (2,2), and (3,3) and for zero distance between nodes. In this example, the univariate probabilities for the different facies are equiprobable, having values equal to ⅓.

It should be observed that with this example model, for a second node adjacent to and above a first node, it is easier to go from facies $c_1$ to $c_2$, from $c_2$ to $c_3$, and from $c_3$ to $c_1$ (the probabilities for the pairs (1,2), (2,3), and (3,1) being around 0.12 for unit distance), than to go directly from facies $c_1$ to $c_3$ (the probability for the pair (1,3) being about 0.04 for unit distance). This model thus presents north/south asymmetry.

To return to FIG. 1, during an initialization step 6, one or more nodes of the grid have respective facies allocated thereto. These facies may be obtained experimentally from the real geological zone, or from a stochastic simulation.

In this example, if observations of the reservoir are available, certain nodes of the grid are filled in using those observations. If no observed data is available, then a facies is allocated to a node by stochastic simulation.

In the first alternative, the observations may comprise the facies that have been observed experimentally at certain points of the reservoir. The observation may be direct, e.g. by core drilling, or it may be the result of interpreting a seismic campaign.

In the second alternative, the facies is obtained by a random draw, weighted by univariate probability values extracted from the model defined in step 1. For each node that it is desired to fill in in this way, draws are taken from among the facies $c_1$, $c_2$, $c_3$. With the example model of FIG. 3, these univariate probabilities $p_1$, $p_2$, and $p_3$ are equal, such that the results of making random draws are the same as for making unweighted draws.

Once these initial steps a), b), 1, and 6 have been performed, each node of the grid to which no value has been allocated, referred to as a "target" node, has a facies allocated thereto as obtained by stochastic simulation (steps c), d), and e)). For each target node, a random draw is performed in step d) from amongst the possible facies $c_1$, $c_2$, $c_3$, this draw being weighted by probability values estimated in step c). Step e) consists in allocating the value as drawn randomly during step d) to the target node, so that the target node becomes a filled-in node with a facies that is available for use during the stochastic simulation of the facies for other nodes.

Steps c), d), and e) may thus be performed several times so as to allocate facies to a plurality of respective nodes, typically each node for which no facies has yet been allocated. Steps of testing and changing target node, represented diagrammatically by references 4 and 5, may thus be implemented so as to scan through the nodes that have not been filled in, e.g. using methods that are well known to the person skilled in the art.

Figure 1B:
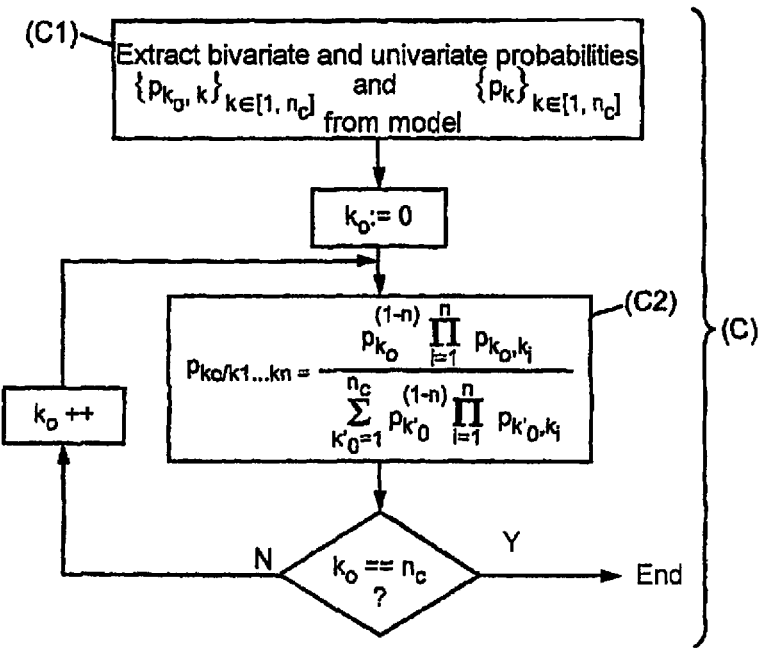

FIG. 1B shows step c) in greater detail. During this step, for a given target node, and for each possible facies $c_1$, $c_2$, $c_3$, a probability $p_{k_0|k_1, \ldots, k_n}$ is estimated. This is a conditional probability $p_{k_0|k_1, \ldots, k_n}$ of observing the facies $c_{k0}$ at the target node $x_0$, knowing that certain nodes $x_i, \ldots, x_n$ in the vicinity of the target node $x_0$ have already had certain respective facies $c_{ki}, \ldots, c_{kn}$ allocated thereto.

A step that is not shown may be provided, during which the nodes in the vicinity of the target node and for which facies have already been allocated are selected for use during step c). For example, one or more distances are defined so as to define a geometrical domain centered on the node $x_0$. For example, three distances define an ellipsoid. In this implementation, account is taken only of nodes for which respective facies have already been allocated, and that are situated within the previously-defined geometrical domain. This selection step serves to limit calculation time while establishing conditional probabilities, since it makes it possible to take into consideration only a small number of bivariate probabilities. This amounts to performing an approximation while calculating conditional probabilities by taking into consideration only the nodes situated in the immediate vicinity of the node for which it is desired to allocate a facies.

Naturally, it would alternatively be possible to make provision for using all of the nodes in the grid to which a facies has already been allocated ("filled-in" nodes) when estimating the conditional probability. This obtains an estimate of the conditional probability that is more exact, but at the cost of calculation that is lengthier.

During a step c1), bivariate probability values are extracted from the bivariate probability model. For each pair of nodes ($x_0$,$x_i$), where $x_0$ is the target node and $x_i$ is a selected node, a bivariate probability value $p_{k_0,k_i}$ is extracted from the bivariate probability models for each possible facies $c_{k0}$. A bivariate probability table is thus established, giving the probability of observing simultaneously a facies $c_{k0}$ at node $x_0$ and a facies $c_{ki}$ at node $x_i$, given knowledge of the relative positions of the nodes $x_0$ and $x_i$. The facies $c_{k0}$ and $c_{ki}$ may be identical or different. Knowing the relative positions of the two nodes $x_0$ and $x_i$, the table of bivariate probabilities for this pair of nodes is easily extracted from the bivariate probability model provided in step 1. Analytic functions give the probability of simultaneously observing a facies $c_k$ at a node $x_i$ and a facies $c_{k'}$ at a node $x_{i'}$ (where k and k' may be identical) as a function of the relative positions of the nodes $x_i$ and $x_{i'}$ under consideration.

For example, for two nodes $x_{(i=1)}$, $x_{(i'=2)}$, that have already been filled in in the vicinity of the target node $x_0$; where the facies $c_1$ is allocated, for example, to the node $x_1$ and the facies $c_2$ is allocated, for example, to the node $x_2$, and for three possible facies $c_1, c_2, c_3$ for $x_0$, the bivariate probability table has three values for each pair $(x_0, x_1)$ and $(x_0, x_2)$, i.e. six values:

$p_{(k_0=1),(k_1=1)}, p_{(k_0=2),(k_1=1)}, p_{(k_0=3),(k_1=1)},$
$p_{(k_0=1),(k_2=2)}, p_{(k_0=2),(k_2=2)}, p_{(k_0=3),(k_2=2)}$

In a prior art method, it would also be necessary to extract an additional bivariate probability value $p_{(k_1=1)(k_2=2)}$ for the pair $(x_1, x_2)$.

It can be understood that for a larger number of neighboring nodes, e.g. about ten, the saving in calculation and memory achieved by the method in an implementation of the invention is much greater.

Figure 2A:
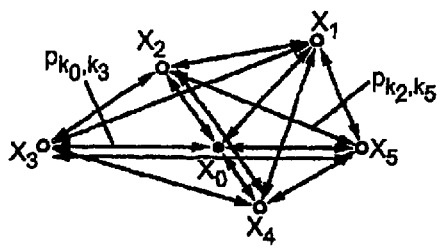
FIGS. 2A and 2B show methods of estimating conditional probabilities, respectively in the prior art and in an implementation of the invention.
Figure 2B:
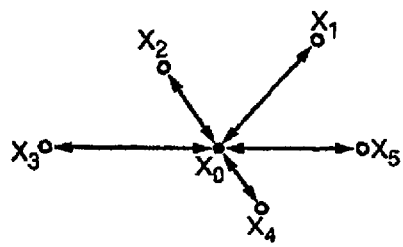

FIGS. 2A and 2B show an advantage as obtained in this way by a method in an implementation of the invention. In these figures, each double-headed arrow between two nodes represents one or more bivariate probability values to be estimated that relate to those two nodes. The method in an implementation of the invention makes it possible to avoid calculating the bivariate probabilities that relate to pairs of nodes in the vicinity of $x_0$ and not including $x_0$. Only those bivariate probabilities that relate to two nodes where one of them is the target node $x_0$ need to be estimated.

During step c1), univariate probability values $p_k$ are also extracted, here three univariate probability values since only three possible facies $c_1, c_2, c_3$ are envisaged.

During a step c2), a conditional probability $p_{k_0|k_1,\ldots,k_n}$ is estimated for each facies $c_{k0}$ that can be envisaged.

The conditional probability is the probability of observing the facies $c_{k0}$ at $x_0$, knowing the facies $c_{ki}$ allocated to the n nodes $x_i$ situated in the neighborhood of $x_0$. A loop may be implemented to scan through the $n_c$ possible facies, where $n_c=3$ in this example, using conventional initialization, test, and incrementation steps. This step c2) makes use of the univariate probabilities and the bivariate probabilities calculated in the preceding steps.

For example, the conditional probability $p_{k_0|k_1,\ldots,k_n}$ of observing a facies $c_{k0}$ at $x_0$ and knowing the facies $c_{k1},\ldots,c_{kn}$ at the n nodes $x_i$ neighboring the node $x_0$ is calculated using the following formula:

$$p_{k_0|k_1,\ldots,k_n} = \frac{p_{k_0}\prod_{i=1}^{n} p_{k_0,k_i}}{\sum_{k'_0=1}^{n_c} p_{k'_0}\prod_{i=1}^{n} p_{k'_0,k_i}}$$

In another example, it is possible to use the following formula:

$$p_{k_0|k_1,\ldots,k_n} = \frac{p_{k_0}^{(1-n)}\prod_{i=1}^{n} p_{k_0,k_i}}{\sum_{k'_0=1}^{n_c} p_{k'_0}^{(1-n)}\prod_{i=1}^{n} p_{k'_0,k_i}}$$

These formulae are calculated relatively easily since they make use solely of univariate probability values and bivariate probability values previously extracted from the analytic functions of the model.

The number of factors for each product is of the same order as the number of neighboring nodes taken into consideration, such that it is possible to take a relatively large number of neighboring nodes into consideration without excessively increasing the calculations.

FIGS. 5A to 5J show examples of two-dimensional grids, with the colors of the nodes corresponding to the facies.

Figure 5A:
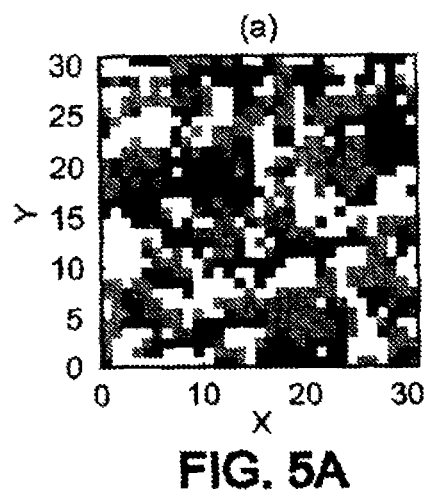
FIGS. 5A to 5J show examples of grids.
Figure 5B:
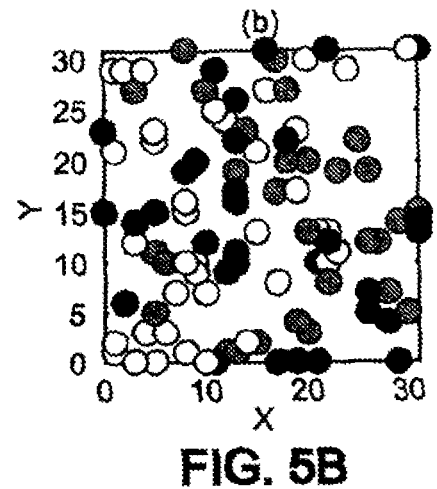
Figure 5C:
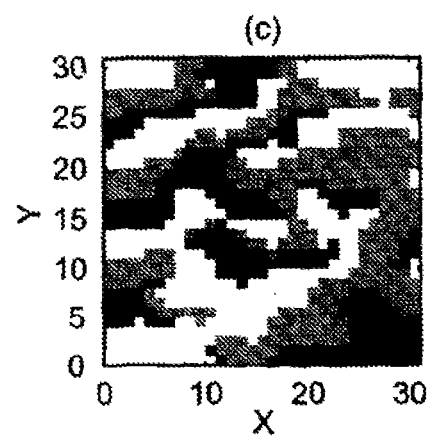
Figure 5D:
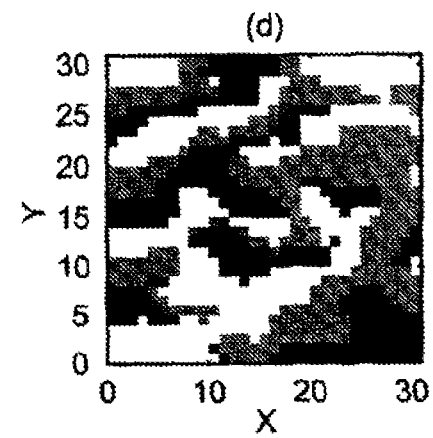
Figure 5E:
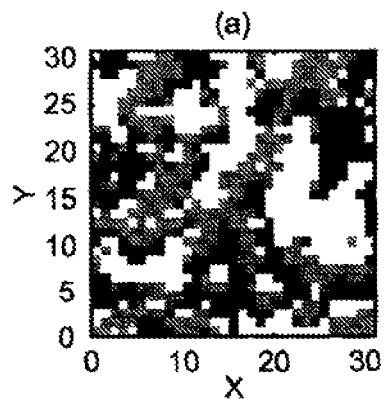
Figure 5F:
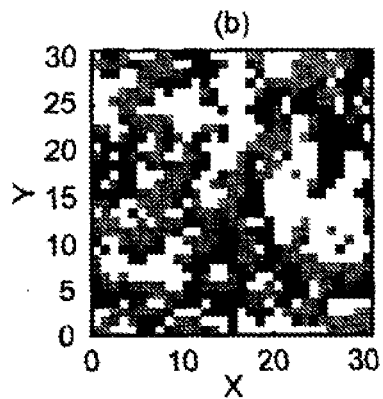
Figure 5G:
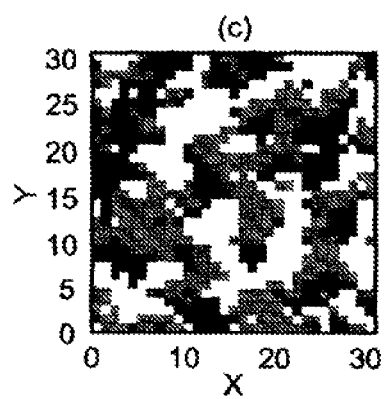
Figure 5H:
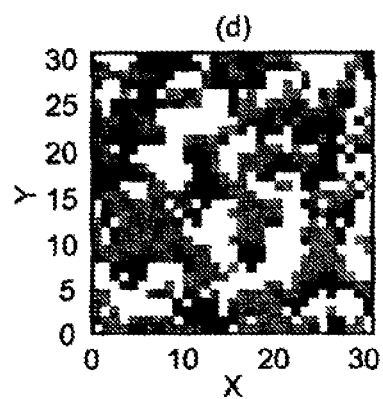
Figure 5I:
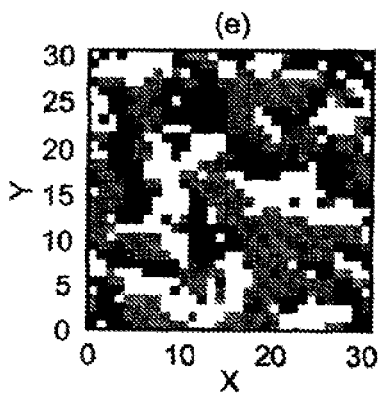
Figure 5J:
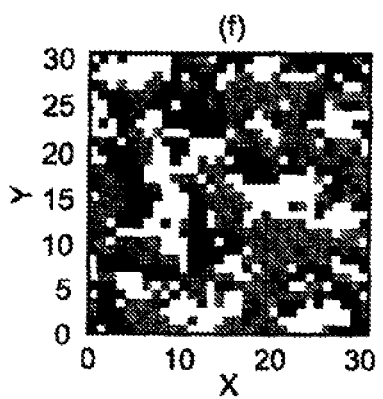

FIGS. 5C and 5D show the results of estimations. To obtain these estimation results, an estimate is made of a conditional probability value for each target node and for each possible facies, using the method of P. Bogaert (FIG. 5C) or using above-described step c) (FIG. 5D). Thereafter, for each target node, the facies corresponding to the highest conditional probability is allocated to that target node.

It is assumed that certain node values are known, e.g. observed data. The nodes initially filled in in this way are shown in FIG. 5B.

FIG. 5A shows a reference grid, from which the facies at the nodes that are assumed to be known have been extracted.

These estimates lead to results that are relatively close to the reference grid (FIG. 5A). These methods thus appear to be relatively reliable for stimulating unknown reservoirs.

It can be seen that the grids of FIGS. 5C and 5D are relatively similar, i.e. that the estimation performed in above-described step c) (FIG. 5D) leads to a result that is relatively similar to the result of an estimation performed using the method of P. Bogaert (FIG. 5C). For more than 98% of the nodes, the relative differences of conditional probabilities are less than 0.0001.

In addition, the method giving rise to the results of FIG. 5D may be executed with a calculation time that is relatively small, in this example about 2 minutes and 30 seconds, in comparison with the 30 minutes that are needed for executing the method that gave to the results of FIG. 5C.

FIGS. 5E to 5J show examples of simulation results, i.e. weighted random drawing performed before allocation. Those results were obtained using a method known in the prior art (FIGS. 5E, 5G, and 5I) and using the method described above (FIGS. 5F, 5H, and 5J). The FIGS. 5E & 5F, 5G & 5H, and 5I & 5J should be compared in pairs. It can be seen that the results are relatively similar. It may be observed that the above-described method leads to results that are slightly less pixelized than in the prior art method, thus making it possible to obtain regions that are geographically more coherent.

Figure 6A:
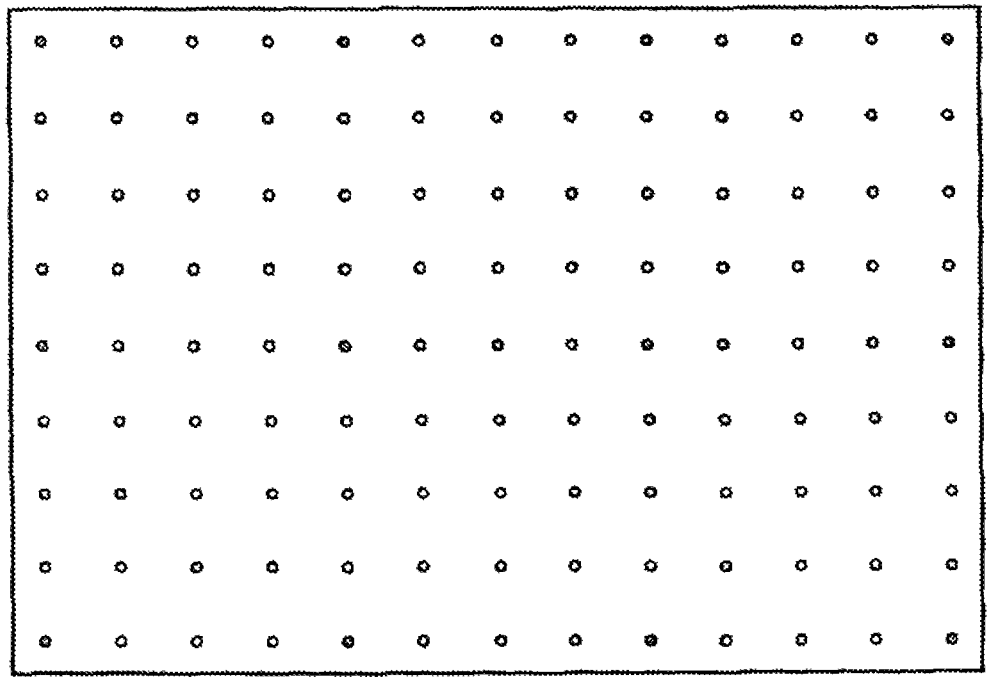
FIGS. 6A to 6C show an example method using a multi-grid approach, in an implementation of the invention.
Figure 6B:
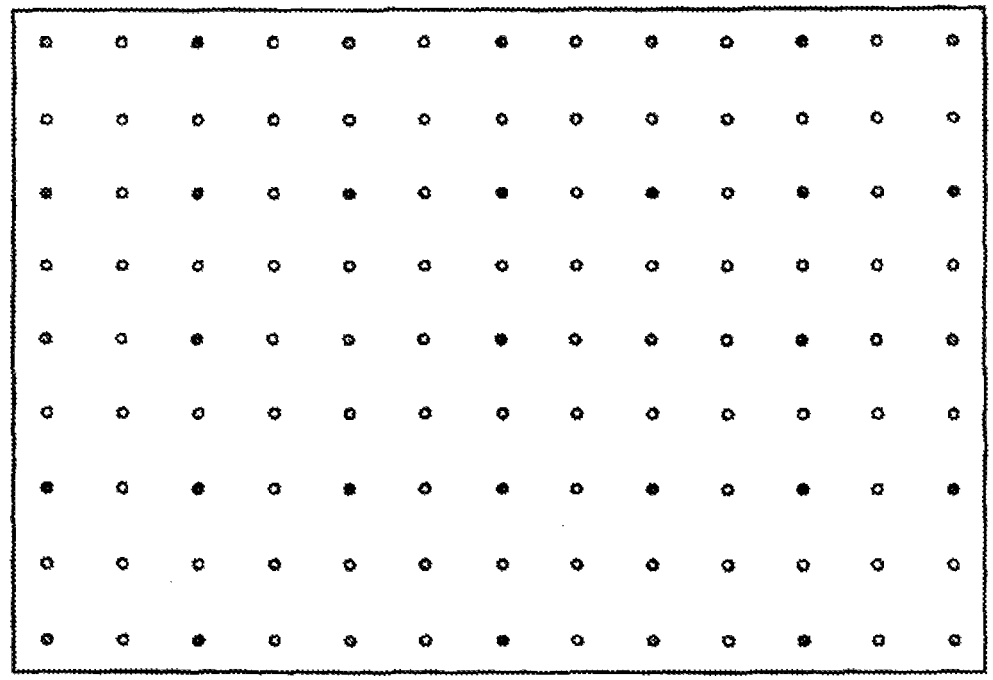
Figure 6C:
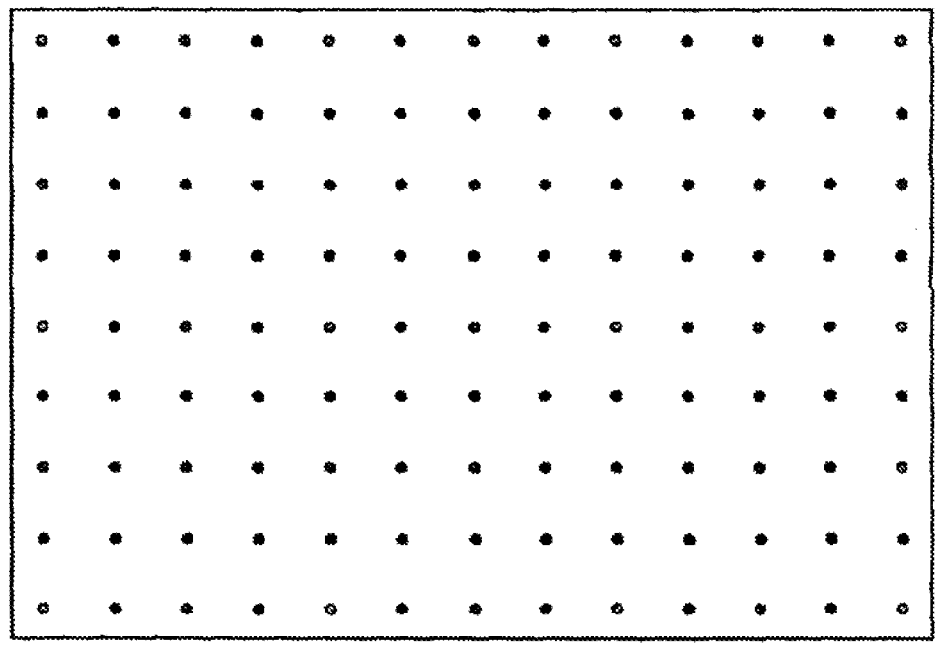

FIGS. 6A to 6C show an example of a method implementing a multi-grid approach in an implementation of the invention. In this implementation, M sub-grids are extracted from the grid provided in step a), and in this example M=2. Each sub-grid is made up of nodes that are mutually spaced apart by half as much as the nodes of the preceding sub-grid. Thus, the sub-grid of level M=2, represented by the solid nodes in FIG. 6A correspond to a maximum pitch of $2^M=4$ times the pitch of the grid. The sub-grid of level M−1=1, represented by the solid nodes in FIG. 6B corresponds to a pitch of $2^{N-1}$ equals twice the pitch of the grid. Finally, the sub-grid of level 0, represented in FIG. 6C, is the grid defined in step a).

Stochastic simulation steps c), d), and e) are initially applied iteratively to the nodes of the $2^{nd}$ sub-grid (FIG. 6A) so as to allocate a facies to each node of this sub-grid. Stochastic simulation is then used to allocate facies to the nodes of the first sub-grid (FIG. 6B), making use of the knowledge of the facies allocated to the nodes of the $2^{nd}$ sub-grid. Finally, facies are allocated to the nodes of the initially-defined grid (FIG. 6C) by making use of the knowledge of the facies allocated to the nodes of the sub-grid in FIGS. 6A and 6B.

This multi-grid approach makes it possible to obtain simulation results that are of relatively good quality, since a favorable star network configuration is adopted. The order in which the nodes of the grid are scanned can have an effect on the quality of the simulation, given that use is made of the previously-allocated facies to allocate a facies to a new node.

Alternatively, it is possible to envisage allocating facies values by stochastic simulation to each node of a grid by scanning through the grid from neighboring node to neighboring node. Nevertheless, for a target node, the conditional probability values run the risk of being biased, insofar as information is available concerning facies for much the greater part in only a particular neighborhood (the preceding nodes for which respective facies have already been allocated).

Returning to FIG. 6A, during the stochastic simulation of a facies for a target node of the second sub-grid, provision may be made to use the filled-in nodes in the neighborhood of the target node only if they form part of the same sub-grid. Alternatively, and preferably, use is made of the nodes to which respective facies were initially allocated and that are situated in the neighborhood of the target node, even if they do not form part of the second sub-grid.

Steps c), d), and e) are then applied to the nodes of the first sub-grid for which no facies have been allocated, and then to the nodes of the initial grid to which no facies have been allocated.

Figure 7:
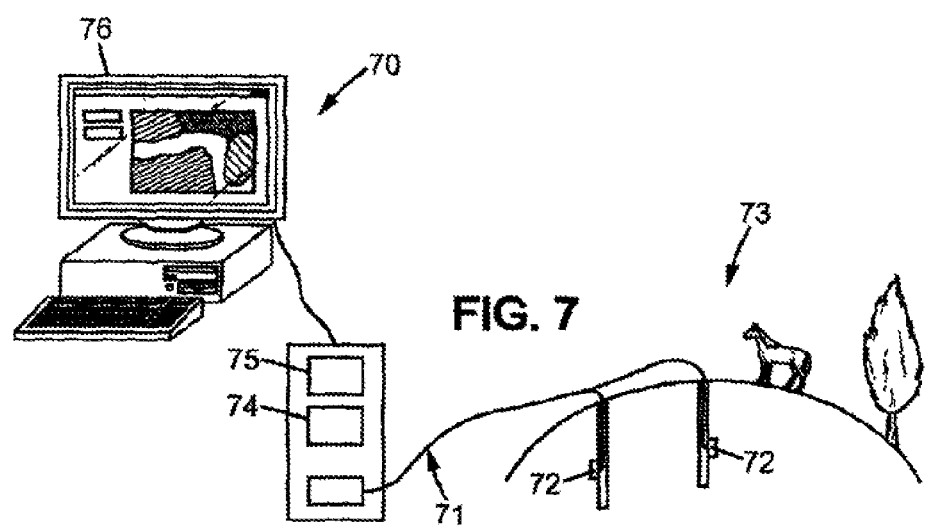
FIG. 7 shows an example of a device in an embodiment of the invention.

FIG. 7 shows a device in an embodiment of the invention. This device comprises a computer 70 connected by communications means 71 to sensors 72 installed in boreholes in a geographical zone 73. These sensors 72 supply observation data from which a processor 75 of the computer 70 can estimate facies.

The computer has a memory unit 74 for storing a representation of the reservoir in the form of a grid. More precisely, the memory 74 is arranged to store the spatial coordinates of the nodes of a grid. The memory 74 is arranged to store a finite number of facies.

On the basis of the location data of the boreholes, the processor 75 determines which node(s) of the grid should have allocated thereto the facies as estimated from the observed data. The memory 74 is arranged to associate this or these facies value(s) with said node(s) of the grid.

The processor 75 is also arranged to execute the steps c), d), and e) of the method described with reference to FIGS. 1A and 1B. In particular, the processor 75 is capable of executing a random draw instruction.

The computer 70 also has a screen 76 for displaying the results of the simulation, e.g. in the form of grids similar to those of FIGS. 5C and 5D. The geologist can study the resulting grid and draw conclusions concerning the locations of hydrocarbons. The simulation of the reservoir may thus constitute a prospecting aid, and more generally an aid for estimating the state of the subsoil, e.g. for estimating the quantities of hydrocarbons present. In particular, the method in an aspect of the invention may be implemented for simulating a field that has already been worked, in order to estimate remaining quantities of hydrocarbons and the locations of those hydrocarbons.

The invention claimed is:

1. A method of estimating lithologic properties of a geological zone simulated by a computer, the method comprising:
a) representing the geological zone using a grid having nodes;
b) representing a lithologic property with the help of a categorical variable; and
for each node in a set of target nodes of the grid to be scanned iteratively:
c) estimating for each possible state of the categorical variable a value for a conditional probability of observing said state for the target node knowing that a respective state has been allocated to a node having an influence on the state of the categorical variable of the target node, on the basis of:
univariate probabilities of observing a state of the categorical variable for the target node; and
bivariate probabilities of observing two states of the categorical variable for two respective nodes of the grid;
wherein the bivariate probability values that are used in estimating the conditional probability relate to the target node and to the node having an influence on the state of the categorical variable of the target node;
so that for each possible state of the categorical variable, the corresponding conditional probability is as follows:

$$p_{k_0/k_1,\ldots,k_n} = \frac{p_{k_0}^{(1-n)} \prod_{i=1}^{n} p_{k_0,k_i}}{\sum_{k_0'=1}^{n_c} p_{k_0'}^{(1-n)} \prod_{i=1}^{n} p_{k_0',k_i}}$$

where:
$k_0$ is an index of the possible state $c_{k0}$ for the target node $x_0$;
$k_1, \ldots, k_n$ are the indices of the states $c_{k1}, \ldots, c_{kn}$ allocated to n the node having an influence on the state of the categorical variable of the target node, n being greater than or equal to 1;
$n_c$ is the number of possible states of the categorical variable, $n_c$ being strictly greater than 1;
$p_{k_0}$ is the univariate probability for a node having the state $c_{k0}$;
$p_{k_0'}$ is the univariate probability for a node having the state $c_{k'}$;
$p_{k_0,k_i}$ is the bivariate probability of observing the states $c_{k_0}$ and $c_{k_i}$ for the target node $x_0$ and a node $x_i$ having an influence on the state of the categorical variable of the target node target node $x_0$; and
$p_{k_0',k_i}$ is the bivariate probability of observing the states $c_{k_0'}$ and $c_{k_i}$ for the target node $x_0$ and the node $x_i$ having an influence on the state of the categorical variable of the target node $x_0$;
d) making a random draw from among the states of the variable, the draw being weighted by the conditional probabilities estimated in step c); and
e) allocating the state drawn randomly in step d) to the target node.

2. A method according to claim 1, comprising, prior to the step of estimating the conditional probability:
providing a model giving, for each pair of states of the categorical variable, a value for the bivariate probability of observing said pair of states for two respective nodes of the grid as a function of the positions of said nodes relative to each other; and
during the step c) of estimating the conditional probability, for each possible state, and for the node having an influence on the state of the categorical variable of the target node for which a given state has been allocated, extracting from the model the value of the bivariate probability of observing the possible state and the given state for two nodes having the same positions relative to each other as the target node and the node having an influence on the state of the categorical variable of the target node.

3. A method according to claim 2, wherein the bivariate probability model is anisotropic.

4. A method according to claim 1, wherein the lithologic property represented by the categorical variable is a rock facies property.

5. A method according to claim 1, further including an initialization step during which a state of the categorical variable is allocated to at least one node of the grid.

6. A method according to claim 5, wherein, in the initialization step, for at least one node, the state allocated to said node is obtained from an observation of the geological zone.

7. A method according to claim 5, wherein, in the initialization step, for at least one node, the state allocated to said node is obtained by random drawing weighted by univariate probabilities.

8. A method according to claim 1, comprising:
extracting a number M of sub-grids having respective levels from the grid defined in step a), the grid defined in step a) being regarded as a sub-grid of level 0, each sub-grid of level m ($1 \leq m \leq M$) being made up of nodes that are spaced apart from one another by half as much as the nodes of the sub-grid of level m−1, the sub-grid of level M corresponding to maximum spacing; and
wherein steps c), d), and e) are initially applied to the nodes of the sub-grid of level M, the method comprising:
for m ranging from M−1 to 0, iteratively applying steps c), d), and e) to the nodes of the sub-grid of level m, using the states allocated to the nodes of the sub-grid of level m+1.

9. A method according to claim 1, wherein the node having an influence on the state of the categorical variable of the target node that is to be taken into consideration during step c) is determined by defining a geometrical domain centered around said target node, and by taking into consideration the nodes situated in said geometrical domain for which a categorical variable state has already been allocated.

10. A device for estimating lithologic properties of a geological zone, the device comprising:
a memory unit for storing spatial coordinates of nodes of a grid representing the geological zone, and a finite number of values corresponding to states of a categorical variable representing a lithologic property; and
a processing unit arranged to perform the following steps iteratively, each iteration corresponding to a target node of the grid:
estimating, for each possible state of the categorical variable, a value for a conditional probability of observing said state for the target node knowing that a respective state has been allocated to a node having an influence on the state of the categorical variable of the target node, the estimation being made:
from univariate probabilities of observing a state of the categorical variable for the target node; and
from bivariate probabilities of observing two states of the categorical variable for two respective nodes of the grid, in which the bivariate probability values used in estimating the conditional probability relate to the target node and to the node having an influence on the state of the categorical variable of the target node;
wherein, for each possible state of the categorical variable, the corresponding conditional probability is as follows:

$$p_{k_0/k_1,\ldots,k_n} = \frac{p_{k_0}^{(1-n)} \prod_{i=1}^{n} p_{k_0,k_i}}{\sum_{k_0'=1}^{n_c} p_{k_0'}^{(1-n)} \prod_{i=1}^{n} p_{k_0',k_i}}$$

where:
$k_0$ is an index of the possible state $c_{k0}$ for the target node $x_0$;
$k_1, \ldots, k_n$ are the indices of the states $c_{k1}, \ldots, c_{kn}$ allocated to n the node having an influence on the state of the categorical variable of the target node, n being greater than or equal to 1;
$n_c$ is the number of possible states of the categorical variable, $n_c$ being strictly greater than 1;
$p_{k_0}$ is the univariate probability for a node having the state $c_{k0}$;
$p_{k_0'}$ is the univariate probability for a node having the state $c_{k'}$;
$p_{k_0,k_i}$ is the bivariate probability of observing the states $c_{k_0}$ and $c_{k_i}$ for the target node $x_0$ and a node $x_i$ having an influence on the state of the categorical variable of the target node $x_0$; and
$p_{k_0',k_i}$ is the bivariate probability of observing the states $c_{k_0'}$ and $c_{k_i}$ for the target node $x_0$ and the node $x_i$ having an influence on the state of the categorical variable of the target node $x_0$;
making a random draw from among the possible states of the categorical variable, the draw being weighted by the conditional probabilities as estimated in this way; and
allocating to the target node the state as randomly drawn in this way.

11. A non-transitory computer-readable medium having a computer program stored thereon for execution by a processing unit of a device used for estimating lithologic properties of a geological zone when the computer program is loaded in the processing unit, the device further having a memory unit for storing spatial coordinates of nodes of a grid representing the geological zone, and a finite number of values corresponding to states of a categorical variable representing a lithologic property,
wherein the computer program includes instructions for performing the following steps iteratively when said instructions are executed by the processing unit, each iteration corresponding to a target node of the grid:
estimating, for each possible state of the categorical variable, a value for a conditional probability of observing said state for the target node knowing that a respective state has been allocated to a node having an influence on the state of the categorical variable of the target node, the estimation being made:
from univariate probabilities of observing a state of the categorical variable for the target node; and
from bivariate probabilities of observing two states of the categorical variable for two respective nodes of the grid, in which the bivariate probability values used in estimating the conditional probability relate to the target node and to the node having an influence on the state of the categorical variable of the target node;
wherein, for each possible state of the categorical variable, the corresponding conditional probability is as follows:

$$p_{k_0/k_1,\ldots,k_n} = \frac{p_{k_0}^{(1-n)} \prod_{i=1}^{n} p_{k_0,k_i}}{\sum_{k'_0=1}^{n_c} p_{k'_0}^{(1-n)} \prod_{i=1}^{n} p_{k'_0,k_i}}$$ (5)

where:
- $k_0$ is an index of the possible state $c_{k0}$ for the target node $x_0$;
- $k_1, \ldots, k_n$ are the indices of the states $c_{k1}, \ldots, c_{kn}$ allocated to n the node having an influence on the state of the categorical variable of the target node, n being greater than or equal to 1;
- $n_c$ is the number of possible states of the categorical variable, $n_c$ being strictly greater than 1;
- $p_{k_0}$ is the univariate probability for a node having the state $c_{k0}$;
- $p_{k'_0}$ is the univariate probability for a node having the state $c_{k'}$;
- $p_{k_0, k_i}$ is the bivariate probability of observing the states $c_{k_0}$ and $c_{k_i}$ for the target node $x_0$ and a node $x_i$ having an influence on the state of the categorical variable of the target node $x_0$; and
- $p_{k'_0, k_i}$ is the bivariate probability of observing the states $c_{k'_0}$ and $c_{k_i}$ for the target node $x_0$ and the node $x_i$ having an influence on the state of the categorical variable of the target node $x_0$;
- making a random draw from among the possible states of the categorical variable, the draw being weighted by the conditional probabilities as estimated in this way; and
- allocating to the target node the state as randomly drawn in this way.

* * * * *